United States Patent Office 3,270,075
Patented August 30, 1966

3,270,075
CATALYTIC TERPENE ISOMERIZATION PROCESS
John M. Derfer, Jacksonville, and Carl Bordenca, Ponte
Vedra Beach, Fla., assignors to The Glidden Company,
Cleveland, Ohio, a corporation of Ohio
No Drawing. Filed Feb. 16, 1965, Ser. No. 433,172
13 Claims. (Cl. 260—675.5)

The present invention relates to terpene hydrocarbon isomerization processes. The invention further relates to improvements in processes wherein the catalytic isomerization reaction of certain bicyclic terpene hydrocarbons is directed to the production of monocyclic terpene hydrocarbons. The present invention more particularly relates to improved catalytic isomerization reaction processes in which the improvement resides in directing the reaction to the formation of products including racemic (e.g. optically inactive) and optically active limonene.

It has been proposed heretofore in U.S. Patent 2,382,-641 to Morris S. Kharasch, patented August 14, 1945, to prepare optically active limonene by heating d- or l-alpha or beta-pinene with organic acids (e.g. benzolybenzoic or salicyclic acids) in the presence of organic acid amides (e.g. formamide or acetamide) at temperatures of from 140°–200° C. The processes of the present invention are economically advantageous in that employment of substantial quantities of expensive organic acids and time-consuming steps to recover such acids are not required.

It has been proposed further (Example 9 of U.S. Patent 3,140,322 of July 7, 1964, to Frilette et al.) to reflux α-pinene in the presence of 10X zeolite to obtain isomerization products with the considerable suppression of polymer formation. The reflux temperature of α-pinene is 154° C. at atmospheric pressure. The predominant product of such operations is the bicyclic terpene camphene and a small proportion of terpene hydrocarbon polymers also results.

It has been presently found that an isomerization reaction process, in which liquid terpene hydrocarbons such as α-pinene, or β-pinene or mixtures thereof are contacted at controlled temperatures well below atmospheric reflux temperatures with a zeolitic metal alumino-silicate catalyst, can be directed to the production of limonene (a monocyclic alkadiene) rather than a process such as that taught by Frilette et al. in which the isomerization is directed to the production of bicyclic camphene. It is surprising that at higher temperatures the starting bicyclic hydrocarbons are converted predominantly to bicyclic camphene and that the bicyclic starting terpene hydrocarbons are converted to monocyclic limonene at lower temperatures. The reverse would be expected in view of the bond energies involved.

It also has been found that when an optically active pinene is employed as the starting terpene hydrocarbon in the above process, the isomerization reaction can be directed substantially to the production of a correspondingly optically active limonene. Stated differently, the isomerization reaction process can be directed to an isomerization reaction in which substantially all of the optical activity of the starting terpene hydrocarbon is retained by the limonene product formed and such optical activity is not lost during the isomerization process.

The term "pinene" as used herein, unless otherwise qualified, is intended to mean and include d-α-pinene, l-α-pinene, d-β-pinene, and l-β-pinene and mixtures thereof.

The term "limonene" as used herein, unless otherwise qualified, is intended to mean and include d-limonene, l-limonene, and optically inactive d-l-limonene.

As starting materials for the preparation of optically active d-limonene, d-α-pinene and d-β-pinene are equivalent. As starting materials for the preparation of l-limonene, l-α-pinene and l-β-pinene are equivalent.

Racemic (e.g. d-, l-) limonene is used commercially as a solvent in the manufacture of resins and as a wetting and dispersing agent. Optically active d-limonene and l-limonene are important and useful components of essential oils, particularly flavoring and perfumery oils.

In the present invention an isomerization reaction from the group consisting of α-pinene, β-pinene and mixtures thereof is contacted with a zeolitic metal aluminosilicate catalyst in a reaction zone, is improved in that the isomerization reaction is directed to the production of limonene. This improvement is accomplished by contacting the starting hydrocarbon under liquid phase conditions with the catalyst in a reaction zone at a temperature in the range of from about 65° C. to about 110° C. By so proceeding a significant portion or substantially all (depending upon the particular temperature, contact time and amount of catalyst employed as hereinafter described) of the starting terpene hydrocarbon is converted to a limonene-rich isomerization reaction mixture (hereinafter sometimes termed an isomerizate) containing limonene as the largest single component, e.g. upwards to 75% by weight of limonene, and a mixture of minor quantities of other terpene hydrocarbons including camphene, terpinene and terpene hydrocarbon polymers.

The terms "isomerization reaction mixture" or "isomerizate" as used herein is intended to mean and to refer to reaction products other than α-pinene or β-pinene which are referred to as the starting terpene hydrocarbons.

In the above process, although contact temperatures below 65° C. may sometimes be employed to form the above referred to isomerizate, extremely long contact times are required to convert or isomerize the starting terpene hydrocarbons and temperatures below 65° C. are therefore impractical. If temperatures above about 110° C. are employed, the isomerization reaction mixture will contain less than 50%, usually less than 30%, often less than 5%, by weight of limonene and an increased amount, (e.g. up to about 40% by weight, based on the weight of the isomerizate) of camphene. It has been found that temperatures in the range of 80–100° C. will generally produce isomerization reaction mixtures containing the highest proportions (e.g. usually from 50–75% by weight based on the weight of the isomerizate) of limonene and these temperature ranges are preferred.

Surprisingly the contact time, that is, the time which the starting liquid terpene hydrocarbon is contacted with the zeolitic metal aluminosilicate catalyst, does not materially affect the character of the isomerizate with respect to the amount of limonene formed. The contact time between the liquid hydrocarbon and the catalyst and the temperature maintained in the reaction zone during the contact, when the temperature is within the aforedefined ranges, relates substantially to the rate at which the starting terpene hydrocarbon will be converted or isomerized and therefore relates to the quantity of isomerizate, rather than to quantitative variation between the components, in the isomerizate, which is formed. At temperatures above about 110° C., however, the conversion of the liquid hydrocarbon to isomerizate proceeds more rapidly but the qualitative character of the isomerizate changes and the formation of substantial quantities of camphene, accompanied by minor amounts of limonene, occurs.

As noted hereinbefore, the catalysts employed in the processes of this invention are known natural and synthetic zeolitic metal aluminosilicate catalysts such as, for example, the zeolite employed in the aforementioned Frilette Patent 3,140,322. Examples of naturally occurring zeolites which may be employed include anacline, chabazite, heulandite, natrolite, stilbite and thomsonite.

Such zeolites can be alkaline earth or alkali metal aluminosilicates, preferably zeolitic alkali metal aluminosilicates having varying $M_2O:AlO_2:SiO_2:H_2O$ ratios wherein M is a metal, preferably an alkali metal, most preferably sodium. These zeolitic crystal metal aluminosilicates are characterized in having a highly ordered arrangement of $AlO_4$ and $SiO_4$ tetrahedra which are interconnected through shared oxygen atoms. The spaces between the tetrahedra are occupied by water molecules prior to dehydration. Dehydration results in crystals interlaced with channels of molecular dimensions and these offer very large space areas for the absorption of foreign molecules provided the crystalline structure remains intact so that the openings into the internal absorption areas are retained.

The electrovalence of the aluminum in the structure is balanced by the inclusion of a cation in the crystal. In synthetic zeolitic aluminosilicate compounds, known in the art as zeolitic molecular sieves, the cation is most commonly an alkali metal such as sodium and potassium or mixtures thereof although alkaline earth metals such as calcium and magnesium also can be included. The cations of either the synthetic or naturally occurring zeolites can be exchanged for other mono-, di-, or trivalent cations which are of a suitable physical size and configuration to diffuse into the intracrystalline passages within the aluminosilicate structure.

The substitution of the original metal cations of the aluminosilicate with hydrogen cations by acid or water leaching is well known. In addition the introduction of hydrogen cations as substitutes for metal cations has been accomplished by ion exchange of the metallic cations with ammonium cations and thereafter heat treating the ammonium exchanged form to liberate ammonia as a gas. In these instances, however, the original metallic cation is either replaced by another metallic cation or by a hydrogen cation. However, the catalysts employed in the processes of this invention do not function by reason of their pores or channels (except as such pores or channels relate to providing increased surface area) but rather function by virtue of their acid sites in the aluminosilicate network. Thus, by way of example, if aluminum silicate per se or a hydrogen substituted aluminosilicate were to be used as a catalyst (instead of metal aluminosilicates) in the above described processes at temperatures within the aforedefined ranges the predominant product formed would be camphene rather than limonene.

The synthetic metal aluminosilicates which can be advantageously employed in the aforementioned processes are zeolitic materials which, prior to dehydration, may be represented by the general formula

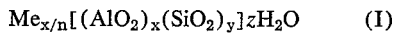
$$Me_{x/n}[(AlO_2)_x(SiO_2)_y]zH_2O \qquad (I)$$

where Me is a metal cation, preferably an alkali metal cation, most preferably sodium, $x/n$ is the number or exchangeable cations of valence $n$ and $x$ is the number of aluminum atoms converted in the form of aluminate, $y$ is the number of silicon atoms and $z$ is the number of water molecules, the removal of which produces a characteristic channel system and, in the present instance, provides maximum surface area per unit weight of catalyst and, therefore, is economically advantageous. In the above formula the ratio $y/x$ is a number of from 1 to 5 and usually from 1 to 2.

A particularly preferred alumino silicate, prior to dehydration, has the unit cell formula

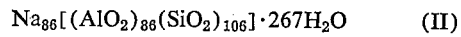
$$Na_{86}[(AlO_2)_{86}(SiO_2)_{106}] \cdot 267H_2O \qquad (II)$$

Upon dehydration this catalyst has pores or channels of about 13 Angstrom units in diameter and is known in the art under the name of "molecular sieve 13X." Another catalyst which may be advantageously employed is known in the art as "molecular sieve 10X" and is a crystalline aluminosilicate salt having channels of about 10 Angstrom units in diameter and is a zeolite in which a substantial proportion of the sodium ions of the 13X material has been replaced by calcium.

Although other zeolitic metal aluminosilicates may be employed, the 13X and 10X materials are preferred, and the 13X material is particularly preferred since conversion of the starting liquid hydrocarbon to the aforementioned isomerizate occurs more rapidly when this material is employed. It is to be understood, however, that substantially the same limonene-rich isomerizate, from the standpoint of character and amount of converted starting hydrocarbon compounds, may be obtained by the 10X material or other zeolitic materials falling with the scope of Formula I when contact between the liquid hydrocarbon and the catalyst is effected within the aforedefined temperature ranges. It is also possible to produce the isomerizate obtained in the processes of this invention by using 10X or 13X materials whose channels or pores have been plugged with a polar material such as ethylene glycol. However, in such instances prolonged contact times (e.g. up to 400 hours) are required to convert significant quantities of the starting liquid hydrocarbon to limonene-rich isomerizate. From the foregoing it is seen that the catalysts employed in the processes of this invention do not function by virtue of their channelled structure but rather function by virtue of contact of the terpene hydrocarbon with the protonic sites on the surfaces of the catalysts.

The catalysts are employed in the processes of this invention in particulate form (e.g. in the form of particles). The term "particulate" as used herein is intended to mean and to include finely divided particles such as powders, fine and coarse granules or agglomerated particles, which have been agglomerated by admixture of the catalysts with small proportions of binders such as clay and large-size tablets or pellets. Advantageous and preferred particulate catalysts are those having a particle size range such that all or substantially all of the particles will pass through a No. 80 mesh U.S. standard screen and all or substantially all of the particles will be retained on a No. 325 mesh U.S. standard screen.

The contact between the catalyst and the liquid hydrocarbon may be effected in a variety of ways, such as, for example, by slurring and agitating finely divided or powdered catalysts and liquid hydrocarbon in a reaction zone and maintaining the slurry at a temperature in the range of between about 65° C. to about 110° C., preferably between 80° and 100° C. Alternatively, contact between the liquid hydrocarbon and the catalyst can be effected by passing the liquid hydrocarbon through a fixed bed of coarse granules or pellets of the catalyst and maintaining the temperature of the liquid hydrocarbon during its passage through the fixed bed within the ranges above described.

The practical contact time, that is, the time required to convert significant quantities of starting liquid hydrocarbon to isomerizate will vary with the amount of catalyst employed, the particle size of the catalyst particles and with the temperature (within the aforedefined range), maximum conversion of the starting hydrocarbon being obtained when larger amounts of catalyst and higher temperatures are employed. By way of example, one volume of catalyst slurried with from 2 to about 50 volumes of liquid hydrocarbon can convert about 80% of the liquid hydrocarbon to isomerizate within from three to about 40 hours when the temperature is in the range of 80°–100° C. Specifically, when one volume of catalyst having the preferred particle size (e.g. —80, +200 mesh) is slurried with 10 volumes of liquid hydrocarbon for the 3-hour time period between 50 and 60% of the liquid hydrocarbon will be converted to isomerizate and when one volume of catalyst is slurried with 20 volumes of liquid hydrocarbon between 30–40% of the liquid hydrocarbon will be converted to isomerizate within the 3-hour time period. In most instances, however, the isomerizate formed will contain more than 51% by weight of limonene and half or less of that percentage (25% or less) of camphene, regardless of the catalyst concentration. When a fixed bed technique is employed it has been found possible to continuously produce an isomerizate containing a predominant amount of limonene by passing the liquid hydrocarbon through the bed at a rate such that from about 0.5 to about 5.0 unit volumes per hour of the hydrocarbon is contacted with one bulk unit volume (which is equivalent to about one weight unit of particulate catalyst when the particles are within the preferred particle size range) of catalyst.

As noted hereinbefore, the starting liquid terpene hydrocarbon which can be employed in the processes of this invention may be α-pinene, β-pinene or mixtures thereof. When it is desired to direct the isomerization process toward the production of optically active limonene, that is, either d-limonene or l-limonene, a correspondingly optically active terpene hydrocarbon is employed. When mixtures of these compounds are employed in a process directed to the preparation of optically active limonene, the mixture should be composed of pinene components having similar optical activity. Thus, for example, when it is desired to direct the isomerization process toward the production of l-limonene, levo-rotatory α- or β-pinene or mixtures of such levo-rotatory liquid pinenes should be employed. Also, when it is desired to direct the isomerization process to the production of d-limonene, dextrorotatory α- and/or β-pinene should be employed.

During the conversion of the optically active terpene hydrocarbon to optically active limonene a slight amount of optical activity may sometimes be lost. Generally, however, such loss in optical activity is insignificant from a practical standpoint.

The process of this invention can be directed to the production of optically inactive or optically active limonenes and represents an economical process for preparing these materials which has distinct economic and other advantages over the process described by the aforementioned Kharasch patent.

As is evident from the foregoing, the processes of this invention may be practiced batch-wise or in a continuous manner. When a batch process is employed, contact of the starting liquid terpene hydrocarbon with the catalyst can be effected by simply slurrying the catalyst in the starting liquid hydrocarbon and agitating or stirring the slurry which is maintained at a temperature within the ranges hereinbefore defined.

The processes of this invention can also be practiced in a continuous manner by continuously contacting the starting liquid terpene hydrocarbon, in optically active or optically inactive form, with a fixed bed of particulate catalyst in a reaction zone and within the aforedefined temperature range. As the starting liquid hydrocarbon is passed through the fixed bed of catalyst in the reaction zone the liquid hydrocarbon or at least a portion thereof is continuously converted to an isomerizate containing a major proportion of limonene which is then continuously removed from the reaction zone as reaction effluent. The limonene is then continuously recovered from the isomerizate by conventional distillation means. In order to accomplish substantial conversion of the hydrocarbon to isomerizate the starting liquid terpene hydrocarbon is passed through the catalytic bed at a rate such that from about 0.5 to 5.0 unit volumes per hour of the liquid hydrocarbon is contacted with one bulk unit volume of the catalyst.

The following specific examples are intended to illustrate the invention and not to limit the scope thereof, parts and percentages being by weight unless otherwise specified.

Example 1

Twenty-five milliliters (22 grams) of l-α-pinene of 90.5% optical purity and 5 grams of a particulate (−80, +200 mesh U.S. standard screen) 13X molecular sieve zeolitic catalyst (a zeolitic sodium alumino-silicate) having a bulk volume of about 5 ml. were added to a 50-milliliter glass reaction vessel equipped with a thermometer, a magnetic stirrer and a heater. The components in the vessel, which consisted of a slurry of l-α-pinene and the sieve, were heated to a temperature of 80° C. and stirred for 70 hours. During the stirring period the temperature of the contents of the vessel fluctuated between 80° and 90° C. After 70 hours the liquid material was separated from the catalyst, analyzed by vapor phase chromatography and found to consist of 2.1 grams of unconverted pinene and 19.9 grams of an isomerization product containing 61.3% of l-limonene, 19.9% by weight of camphene and 18.8% of a mixture of hydrocarbons other than camphene, limonene or α-pinene. The limonene was fractionally distilled, at a temperature of 109±2° C. at 100 mm. pressure, from the reaction mixture and 12.4 grams of a product consisting substantially of l-limonene having molecular purity of 93% and an optical purity of 80.2% was obtained.

The procedure of the above example was repeated, except that a contact temperature of 150° C. was employed during the stirring operation instead of the 80–90° C. temperature employed in Example 1. After 70 hours the liquid was separated from the catalyst, was analyzed by vapor phase chromatography and found to contain 10% by weight of limonene, 39% camphene and 60% by weight of a mixture of terpene hydrocarbons other than limonene, camphene or α-pinene.

Example 2

The procedure described in the first paragraph of Example 1 was repeated except that d-α-pinene was used in place of the l-α-pinene employed in that example. Twenty-one grams of an isomerization reaction mixture were obtained from which approximately 13 grams of d-limonene were recovered.

When d-β-pinene was employed in place of l-α-pinene in the process of Example 2, substantially the same quantity of d-limonene was recovered as the l-limonene which was obtained in Example 2.

Example 3

Twenty-five milliliters of d-α-pinene of 90.5% optical purity and 5 grams of a powdered (−200, +325 mesh U.S. standard screen) 13X molecular sieve zeolite (a product substantially identical chemically to the catalyst employed in Example 1) were added to the 50-milliliter glass laboratory reaction vessel described in Example 1. The reaction mixture, which consisted of a slurry of the catalyst in d-α-pinene, was heated to 80° C. and stirred for 3 hours. During the stirring period the temperature of the slurry fluctuated between 80° C. and 90° C. After three hours the liquid was separated from the catalyst by filtration, was analyzed using vapor phase chromatography and found to consist of about 5 grams of α-pinene and 20 grams of an isomerization product mixture containing 56.2% by weight of d-limonene, 26.3% by weight of camphene and 17.5% of a mixture of terpene hydrocarbons other than pinene, limonene and camphene. The isomerization mixture was fractionally distilled and approximately 11 grams of optically active d-limonene was obtained.

The procedure of Example 3 was repeated, except that 2.5 grams of molecular sieve catalyst was employed in place of the 5-gram quantity employed in Example 2. After the 3-hour heating and stirring time the liquid was separated from the catalyst and analyzed and found to contain 10.5 grams of α-pinene and 13.5 grams of an isomerization product which contained 51.8% by weight of d-limonene, 25% by weight of camphene and 23.2% by weight of terpene hydrocarbons other than limonene, camphene or pinene. Upon distillation, 9.5 grams of substantially pure d-limonene was obtained.

The procedure of Example 3 was repeated, except that 1.25 grams of 13X molecular sieve catalyst was employed instead of the 5-gram quantity of catalyst employed in that example. After 3 hours the separated liquid was found to contain 16.5 grams of α-pinene and 8.5 grams of an isomerization product containing 55.8% d-limonene, 26.5% camphene and 17.7% of terpene hydrocarbons other than limonene, camphene or pinene.

*Example 4*

The procedure described in the first paragraph of Example 3 was repeated, except that a powdered (−80, +325 mesh) 10X zeolitic molecular sieve (that is, a 13X sieve having substantial portions of sodium ions in that material replaced by calcium ions) was employed in place of the 13X sieve used in that example. The product obtained consisted of 15.5 grams of pinene and 8.5 grams of an isomerization reaction product which contained 64% by weight of limonene.

When magnesium silicate was substituted for the molecular sieve in the process described in the first paragraph of Example 3, the separated liquid contained 8.5 grams of pinene and a reaction mixture containing 41.5% camphene and 35.2% limonene and 23.3% of terpene hydrocarbons other than pinene, camphene or limonene.

*Example 5*

The procedure described in the first paragraph of Example 3 was repeated, except that the 13X zeolitic molecular sieve employed had been treated with ethylene glycol to plug the channels of the molecular sieve. Also, the contact between the hydrocarbon and the plugged sieve was increased to 65 hours. The product obtained consisted of 13 grams of pinene and about 11 grams of an isomerizate product which contained 55.5% by weight of limonene.

*Example 6*

The procedure described in the first paragraph of Example 3 was repeated, except that the 13X zeolitic molecular sieve employed in that example was replaced by a 13X molecular sieve in which a significant portion of the sodium cations of the sieve had been exchanged for lithium cations. The contact time between the pinene and the lithium-treated catalyst was 2 hours. The product obtained consisted of 2 grams of unreacted pinene and about 21 grams of an isomerization reaction product which contained 45% by weight of limonene, 22.4% camphene and 32.6% of hydrocarbon with the camphene, limonene and pinene.

*Example 7*

To a stainless steel tank equipped with a pump and connected by means of a tube, provided with a flow control valve, to the lower end of a vertical cylindrical reactor there was added 20 kgs. (approximately 23 liters) of d-α-pinene.

The cylindrical reactor to which the tank was connected consisted of a stainless steel tube four meters long, having an internal diameter of 3.5 centimeters and provided with a heating jacket which surrounded the tube. The reactor was provided with a bottom inlet and an outlet at the top of the tube to collect the reaction effluent. The tube contained a fixed amount of particulate (−80, +200 mesh U.S. standard screen) of the 13X molecular sieve zeolite employed in Example 1. The bulk volume of the granular catalyst was 3700 milliliters and the weight of the catalyst was 3.7 kg. The catalyst bed was maintained in fixed position by means of screens at each end of the tube. The liquid was heated to a temperature of 80° C. and was pumped upwardly through the reactor bed continuously for a two-hour period, during which time 500 grams of the d-α-pinene was pumped through the reactor bed. The reactor was maintained at a temperature of 100°±3° C., by means of the heating jacket. The reaction effluent which was collected was cooled, analyzed by vapor phase chromatography and found to consist of 6.2% d-α-pinene and 93.8 weight percent of an isomerization reaction mixture which upon separation of the d-α-pinene therefrom was found upon analysis to consist of 61% by weight of d-limonene having an optical purity of 85%, 26% camphene and 13% of terpene hydrocarbons other than pinene, camphene and limonene. The isomerization reaction mixture was fractionally distilled using a 5:1 reflux ratio and a distilling column having the equivalent of about 10 theoretical plates. At the end of the distillation 11.2 kg. of substantially pure d-limonene were obtained.

The above process for preparing d-limonene can be practiced employing d-β-pinene or a mixture of d-α- and d-β-pinene as starting materials in the same quantities as the d-α-pinene and substantially the same quantities of d-limonene will be obtained.

When it is desired to produce l-limonene, the above products in levo-rotatory form can be substituted for the d-α-pinene in substantially the same quantities and rates employed and the product obtained in such process will be l-limonene.

In the foregoing examples it will be noted that the isomerization reaction mixture obtained was a limonene-rich isomerizate in which the limonene:camphene ratio was approximately 2:1. When reflux or near reflux temperatures, that is, temperatures of about 135° C. to 154° C. are employed in procedures outlined in the foregoing examples, considerably more camphene is produced and in most instances camphene becomes the predominant single product present in the isomerizate.

What is claimed is:

1. In an isomerization reaction process wherein a liquid terpene hydrocarbon selected from the group consisting of α-pinene, β-pinene and mixtures thereof is contacted with a zeolitic metal aluminosilicate catalyst in a reaction zone, the improvement for directing the isomerization reaction to the production of limonene which comprises: contacting said liquid hydrocarbon under liquid phase conditions with said catalyst in said reaction zone at a temperature in the range of from about 65° C. to about 110° C.

2. A process as in claim 1 wherein the liquid hydrocarbon is α-pinene.

3. A process as in claim 2 wherein the catalyst is an alkali metal aluminosilicate.

4. A process as in claim 3 wherein the catalyst consists essentially of the substantially dehydrated product of a synthetic zeolite of the formula:

$$Me_{x/n}[(AlO_2)_x(SiO_2)_y]zH_2O$$

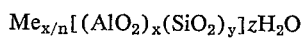

where Me is a metal cation, $x/n$ is the number of exchangeable cations of valence $n$, $x$ is the number of aluminum atoms, $y$ is the number of silicon atoms and $z$ is the number of water molecules.

5. In an isomerization reaction process wherein a liquid terpene hydrocarbon selected from the group consisting of α-pinene, β-pinene and mixtures thereof is contacted with a zeolitic metal aluminosilicate catalyst in a reaction zone, the improvement for directing the isomerization reaction to the production of optically active limonene which comprises contacting an optically active liquid terpene hydrocarbon selected from the group consisting of optically active α-pinene, optically active β-pinene and mixtures thereof having similar optical activity, under liquid phase conditions with said catalyst in said reaction zone at a temperature in the range of from about 65° C. to about 110° C.

6. A process as in claim 5 wherein the optically active liquid terpene hydrocarbon consists substantially of l-α-pinene.

7. A process as in claim 5 wherein the optically active liquid terpene hydrocarbon consists substantially of d-α-pinene.

8. A process as in claim 5 wherein said optically active liquid terpene hydrocarbon is contacted with said catalyst in said reaction zone at a temperature in the range of from about 80° C. to about 100° C.

9. A process as in claim 5 wherein from about 2 to about 50 unit volumes of said optically active liquid hydrocarbon are contacted with one unit volume of catalyst in particulate form.

10. In an isomerization reaction process wherein a liquid terpene hydrocarbon selected from the group consisting of α-pinene, β-pinene and mixtures thereof is contacted with a zeolitic metal aluminosilicate catalyst in a reaction zone, the improvement for directing the isomerization reaction to the production of optically active limonene which comprises contacting an optically active liquid terpene hydrocarbon selected from the group consisting of optically active α-pinene, optically active β-pinene and mixtures thereof having similar optical activity with a particulate catalyst consisting essentially of the substantially dehydrated product of a zeolite having the unit cell formula $$Na_{86}[(AlO_2)_{86}(SiO_2)_{106}] \cdot 267H_2O$$

under liquid phase conditions in said reaction zone and at a temperature in the range of from about 65° C. to about 110° C.

11. In an isomerization reaction process wherein a liquid terpene hydrocarbon selected from the group consisting of α-pinene, β-pinene and mixtures thereof is contacted with a zeolitic metal aluminosilicate catalyst in a reaction zone, the improvement for directing the isomerization process to optically active limonene which comprises (1) continuously contacting an optically active hydrocarbon selected from the group consisting of optically active α-pinene, optically active β-pinene and mixtures thereof having similar optical activity with a fixed bed of a particulate catalyst in a reaction zone, at a temperature of from about 80° C. to about 90° C., said catalyst having the formula $$Na_{86}[(AlO_2)_{86}(SiO_2)_{106}]$$

thereby continuously forming a terpene hydrocarbon isomerizate containing a major portion of optically active limonene and a minor proportion of terpene hydrocarbons other than said first mentioned liquid hydrocarbon and said limonene, said hydrocarbon being contacted with said catalyst at a rate such that about 0.5 to about 5.0 volumes of said hydrocarbon is contacted with one bulk volume of said catalyst per hour, (2) continuously removing said isomerizate from said reaction zone and recovering optically active limonene therefrom.

12. A process as in claim 11 wherein the optically active liquid terpene hydrocarbon is substantially d-α-pinene and the optically active limonene obtained is substantially d-limonene.

13. A process as in claim 11 wherein the optically active liquid terpene hydrocarbon is substantially l-α-pinene and the optically active limonene obtained is substantially l-limonene.

No references cited.

DELBERT E. GANTZ, *Primary Examiner.*

G. E. SCHMITKONS, *Assistant Examiner.*